United States Patent Office
2,948,631
Patented Aug. 9, 1960

2,948,631

REFRACTORY LIME

Robert W. McAllister, Box 85, Carlisle, Mass.

No Drawing. Filed June 6, 1957, Ser. No. 663,891

14 Claims. (Cl. 106—58)

This invention relates to the preparation of a refractory lime and more particularly to a lime composition which is capable of being employed as a refractory material at very high temperatures.

It would be desirable to be able to use quick lime, CaO, as a refractory material since it has a high melting point, i.e., about 4600° F. However, CaO is subject to hydration in the presence of moisture and the resulting calcium hydroxide which is formed decomposes at about 1100° F. to CaO and $H_2O$, simultaneously changing in physical form and shape. This means that it is no longer serviceable as a refractory material. It is necessary, therefore, to modify lime to make it stable under conditions prevailing in refractory use.

Lime has the advantage of being abundant and cheap in addition to having a relatively high melting point. Because of this, many attempts have been made in the past to modify or to otherwise treat lime in such a manner that it could be used as a high temperature refractory material. Such methods have included adding titanium dioxide (see U.S. Patent 2,528,471), adding titanium dioxide and zirconium dioxide (see U.S. Patent 2,678,887), roasting calcium-containing ores, or adding various other oxides including those of cerium, molybdenum, chromium, sodium, lanthanum, etc. However, none of these methods has proved entirely satisfactory and none of them has offered a means of making a cheap and stable lime refractory.

The term "lime" is used generally to indicate a burned product and will be used in a generic sense hereinafter in this description. More precisely, calcium oxide, CaO, is known as quick lime; calcium hydroxide, $Ca(OH)_2$, is known as hydrated lime; while the carbonate, $CaCO_3$, is known as limestone. The lime applicable to the process of this invention includes these three compositions and refers more specifically to what is called high-calcium lime, i.e., a lime having not more than 5% magnesia, MgO. Although any of these forms of lime may be used in the practice of this invention, it has been found preferable to employ $Ca(OH)_2$ or $CaCO_3$ as the initial form. These will, of course, decompose under heating to form CaO.

Because of the abundance of lime and its relative cheapness, it would be desirable to be able to treat lime with a minimum amount of an additive to make it usable as a high-temperature refractory which would not be subject to hydration. It would also, of course, be desirable to be able to use an additive which itself is cheap and abundant.

It is therefore an object of this invention to provide a refractory material, the major portion of which is lime, which is not susceptible to hydration. A further object is to provide a cheap refractory material which is capable of withstanding high temperatures up to about 3300° F. Another object is to provide a refractory material which may have a wide range of workable temperatures, and which is easily moldable to shapes and forms such as bricks, crucibles, etc. It is another object to provide a composition suitable for ramming or tamping into place in a monolithic lining for facings of furnaces. These and other objects will be apparent in the following description.

As indicated above the lime may be used in the form of CaO, $Ca(OH)_2$, or $CaCO_3$ inasmuch as during the heating of the composition to make the refractory material of this invention the latter two of these are converted to CaO; that is, the $Ca(OH)_2$ decomposes to CaO and $H_2O$, while the $CaCO_3$ decomposes to CaO and $CO_2$.

The refractory material of this invention, which is capable of withstanding high temperatures and is yet resistant to hydration, is formed by mixing finely divided lime (in one of the three forms noted above) with finely divided silica ($SiO_2$) and alumina ($Al_2O_3$) and heating the mixture. In the process sufficient fusion and/or solid state reaction takes place to form an essentially amorphous material in which the unaffected portions of the lime particles are embedded and so protected as not to be subject to any appreciable subsequent hydration.

The CaO present in the final refractory material may range from about 65% to 85% of the total weight of the resulting refractory material. If the CaO is present in about 60% of the total weight of the resulting mixture, the refractory tends to crumble after cooling; while if CaO is present in percents over 85%, the resulting refractory does not show the required resistance to hydration. When $Ca(OH)_2$ or $CaCO_3$ is used in place of CaO, the parts by weight are calculated to give an equivalent of about 65% to 85% CaO in the final refractory.

The refractory material of this invention can be used at temperatures ranging from about 2500 to 3300° F. depending upon the percentage of lime present; that is, the larger the percent of lime the greater the temperature at which the material may be employed as a refractory. However, the susceptibility to hydration or slaking is increased with increasing amounts of lime. Thus, increasing the amount of lime in effect shortens the possible useful life of the refractory material when subjected to high humidity conditions, but raises the temperature which it can tolerate. A preferred composition comprises about 70 to 75% CaO in the final refractory.

If the high calcium lime used contains little or virtually no magnesia, it has been found desirable to add small quantities of magnesia, up to about 5%. The preferred range is from about 2% to 3%, inasmuch as it appears that no additional improvement is realized in the range of 3% to 5% over that realized in the range of 2% to 3% magnesia.

The mixture of alumina and silica forming the other compounds of the refractory will range from about 15% to 35% by weight of the total weight of the refractory material formed. In the mixture of alumina and silica the amount of alumina may range from about 35% to about 60% by weight of the mixture, while the amount of silica would then correspond to a range of about 65% to 40% by weight. Although the silica and alumina may be introduced as individual components, it has been found practical in the practice of this invention to introduce them as naturally-occurring clays, for example as one of the following:

| Clay | Weight percent $Al_2O_3$ | Weight percent $SiO_2$ |
|---|---|---|
| Sillimanite | 63 | 37 |
| Bauxite | 54 | 26 |
| Kaolin (China Clay) | 38 | 44 |
| Fireclay | 35 | 45 |
| Kyanite | 59 | 38 |

Of these, china clay consisting of approximately equal parts by weight of alumina and silica, has been found to be preferable. Although mixtures containing percentages of alumina higher than that present in china clay are satisfactory, the higher percentages of alumina produce a refractory material having a fusion point lower than that produced when china clay is used. The term china clay is commonly used interchangeably with the term kaolin as they refer to the same product.

Such clays may be generally defined as hydrous silicates of alumina; china clay having a formula represented as $Al_2O_3 \cdot 2SiO_2 \cdot 2H_2O$. The compound which is represented by this formula has a softening temperature of about 3240° F.

It is known that mixtures of $SiO_2$ and $Al_2O_3$ or clays containing them are capable of forming certain essentially amorphous complexes with CaO, among which may be listed anorthite having the formula $$CaO \cdot Al_2O_3 \cdot 2SiO_2$$

and a melting point of 2824° F.; gehlenite having the formula $Ca_2Al_2SiO_7$; and a mixture of 26% CaO, 3% MgO, 36% $Al_2O_3$ and 35% $SiO_2$, having a softening or melting point at about 2550° F.

It will be noted that in the case of the anorthite the aluminum and silicon oxides are present in the same molecular ratio as they exist in the china clay. Anorthite has been found to have a melting point of 2824° F., a temperature which corresponds closely to the range in which the refractory of this invention is formed. In the case of the other two examples of the complexes which may form from the oxides of calcium, aluminum and silicon it will be noted that they are deficient in silica. This however, does not rule out the possibility of their formation in the process of this invention.

It therefore seems reasonable to conclude that a complex of the oxides of calcium, aluminum and silicon similar to anorthite, or other complexes, may be formed in the process of this invention and this amorphous material serves as a matrix in which the lime particles are embedded and hence protected from subsequent hydration. This theory is offered only as one explanation of what may happen and I do not wish to be bound by it.

In the process of forming the refractory of this invention, pressure and heat are applied and there occurs some shrinkage and hence weight loss. However, the final refractory material usually consists of the oxides of calcium, aluminum and silicon in about the same weight percentages as were present in the components of the original refractory material. Thus, for example where the lime is introduced in the form of $Ca(OH)_2$ and china clay is used, it has been found that the $Ca(OH)_2$ loses about 25% by weight by ignition while the clay loses about 14% by weight by ignition. Hence, where a mixture of 75% $Ca(OH)_2$ and 25% clay was originally made up, the final percentages was about 73% CaO and about 27% clay. In the case of the $Ca(OH)_2$ the losses are due primarily to the loss of water driven off in the heating process, while in the case of $CaCO_3$ the loss is due to elimination of $CO_2$ in the heating process. Where CaO is used the loss will be less, while in the case of $CaCO_3$ the loss will be somewhat more than for $Ca(OH)_2$.

As indicated above, the refractory material of this invention may be so compounded as to give a final refractory capable of being used over a wide temperature range. The variation of useable temperatures is achieved by varying the amounts of lime and alumina and silica in the original mixture. Using, for example, a mixture of hydrated lime, $Ca(OH)_2$, and china clay, the firing temperatures and maximum useable temperatures for a series of compositions over a range of lime to clay can be tabulated as follows. (In this tabulation it is to be understood that MgO may be present up to amounts of about 5% by total weight of the refractory, thus reducing to a minor extent the percentages given for the lime and clay in the tabulation.)

| Percent Lime | Percent Clay | Formation Temperature of Refractory, ° F. | Maximum Temperature of Use, ° F. |
|---|---|---|---|
| 65 | 35 | 2,500 | 2,800 |
| 70 | 30 | 2,600 | 2,900 |
| 75 | 25 | 2,800 | 3,000 |
| 80 | 20 | 2,900 | 3,150 |
| 85 | 15 | 3,000 | 3,300 |

Many compositions of the refractory material of this invention have been prepared. Inasmuch as the formulation technique was usually the same, it may be described generally below. Following this general description there is given a tabulation summarizing the test results and evaluations of these compositions which are cited as examples of the practice of this invention.

Although the particle sizes of the alumina and silica (or of clays containing them), and of the various forms of lime have not been found to be critical, it is preferable to use finely-divided material. Thus, in the case of clays, material which largely passed through a 325-mesh screen was used. The hydrated lime normally occurs in particles of the range of 1 to 10 microns; while crushed CaO normally will be in particle sizes ranging from 20 to 80 microns; and $CaCO_3$, or limestone, can be crushed to any size, preferably from about 20 to 80 microns.

Thorough initial mixing of the components of the refractory of this invention is of primary importance in order that the relatively small amount of deactivating material ($SiO_2$ and $Al_2O_3$) may come into intimate contact with the maximum number of CaO particles. The scale on which the mixing is to be accomplished will determine the type of mixing to be done. For example, in the laboratory it has been found expedient to dry mix the various components for about 5 minutes in a paddle-type mixer or any other suitable device. The mixture is then screened through an 80-mesh screen using a brush to force it through. Such product is then given a second mixing in the paddle mixer, followed by a second screening through an 80-mesh screen.

When the composition is mixed in large-scale industrial equipment, other mixing equipment may prove preferable. For example, wet mixing has been used whereby the dry powder is wetted with enough water to permit wet ball-milling for several hours. A tube mill has also been found satisfactory. After the wet milling is completed, the wet paste is partially dried and then extruded into dobie bricks. Such bricks are then dried before they are fired.

If the components are dry mixed, or wet mixed and then dried, the resulting dry mixture may be pressed into dobie bricks at pressures sufficient to give the dobie strength enough to be removed from its mold form for subsequent heating. Pressures as low as 1 ton per square inch have generally been used. Greater pressures may, of course, be used. The dobie bricks, which have been extruded and dried or which have been pressed dry, are then fired in a furnace at the prescribed temperature for the composition being used (see the tabulation above). Firing is commonly carried out from 4 to 24 hours and the dobies are permitted to cool gradually in the high-temperature furnace in which they are fired.

After the dobies have been cooled, they are crushed to the size found preferable in the formation of the final refractory. The particle size of the crushed material will vary according to the type of refractory required and in many cases it will be necessary to mix and blend certain ranges of particle size to obtain the desired final result. After crushing and mixing of the particles according to size, kerosene is added as a lubricant and the material is pressed into the desired shape, e.g., bricks, crucibles, etc. The final firing temperature after pressing is usually about 100° or 200° F. higher than that used for firing the dobies. The finally-fired material is then permitted to cool slowly.

The crushed material made from the dobies may, of course, be used in tamping or filling linings for furnaces without further firing and molding into shape.

A series of tests have been developed which make possible a system for evaluating the refractory material in a very short time. These tests include exposing the refractory material to various humidities and various temperatures. Although the manner in which the results of these tests may be extrapolated to predict an actual life of the refractory has not been precisely determined, it is believed by comparison with similar data for commercially available refractories, that any refractory material which can satisfactorily withstand exposure to 100% relative humidity and about 124° F. for five days should have an indefinite life as a refractory material. It may be that refractories which hold up for only two days under these conditions are also satisfactory.

The various compositions which have been prepared by the manner described above are listed in the tabulation below along with the results of the evaluation tests which included exposing the samples to a temperature of 124° F. and relative humidities of 85, 95, and 100% and at a temperature varying between 104 and 165° F. and relative humidities of 85, 95, and 100%.

| Original Composition percent by Weight | | Condition of Sample After 5 Days' Exposure to— | | | | | | Rating[1] |
|---|---|---|---|---|---|---|---|---|
| Lime Hydrate | Clay | 124° F | | | 104-165° F | | | |
| | | 85% R.H. | 95% R.H. | 100% R.H. | 85% R.H. | 95% R.H. | 100% R.H. | |
| 65 | 35 | U | U | U | U | U | U | Excellent. |
| 70 | 30 | U | U | U | U | U | U | Excellent. |
| 75 | 25 | U | U | U | U | U | U | Excellent. |
| 80 | 20 | U | U | Ch | U | U | Cr | Excellent. |
| 85 | 15 | U | U | Ch | U | U | Ch | Excellent. |

U—unchanged  Ch—chipped  Cr—Cracks appeared
[1] Rating based on behavior in tests and physical appearance.

A second test which may be applied to determine the stability of refractory lime samples against hydration is the "reflux test." In such test freshly-broken refractory lime samples are placed in a water-containing flask equipped with reflux condenser. Samples are then refluxed until they either crack or show material in suspension. Samples which show no breakdown for 48 hours are considered sufficiently slake-resistant to meet any conditions of use. By this test 65–85% lime-containing samples pass the test whereas 86–95% lime samples fail.

Thus, this invention provides a high-temperature refractory which is easily made from abundant and cheap materials and a process for making such a refractory. It accomplishes this by so modifying high-calcium lime that it is made slake-resistant without materially reducing the temperatures which it can withstand and yet maintain its structural integrity. The modification, in turn, appears to consist of embedding finely divided CaO particles in a protective, essentially amorphous matrix formed by fusing (or reacting in a solid state) the oxides of calcium, aluminum and silicon, the two latter oxides being preferably furnished as a naturally-occurring clay.

The deactivation of high-magnesium lime (defined as lime that contains more than 5% magnesium oxide) is the subject of my co-pending application, Serial No. 663,893.

I claim:

1. Refractory composition consisting essentially of from about 65% to 85% high-calcium lime and from about 35% to 15% of a mixture of alumina and silica by total weight of said composition, said alumina and silica mixture containing between from about 35% to 60% by weight of alumina, and said high-calcium lime containing from about 2% to 5% magnesia.

2. Refractory composition in accordance with claim 1 wherein said high-calcium lime is calcium hydrate having an average particle size ranging from about 1 to 10 microns.

3. Refractory composition in accordance with claim 1 wherein said mixture of alumina and silica is a naturally-occurring clay.

4. Refractory composition in accordance with claim 3 wherein said clay is kaolin.

5. Refractory composition, consisting essentially of from 65% to 85% calcium oxide, from 35% to 15% of a mixture of alumina and silica, and from about 2% to about 5% magnesia by total weight of said composition, said alumina and silica mixture containing between from about 35% to 60% by weight of alumina.

6. Refractory composition in accordance with claim 5 wherein said mixture of alumina and silica is a naturally-occurring clay.

7. Refractory composition in accordance with claim 6 wherein said naturally-occurring clay is kaolin.

8. Refractory composition of matter suitable for formulating a refractory material, consisting essentially of about 25% kaolin, 73% calcium hydrate, and 2% magnesia.

9. Process for making a high-temperature refractory material, comprising the steps of mixing thoroughly together from about 65% to 85% high-calcium lime, containing from about 2% to 5% by weight MgO, and from about 35% to 15% of a composition consisting essentially of alumina and silica the alumina content of which ranges from about 35 to 60% by weight, pressing the resulting mixture in a mold to impart structural strength sufficient to remove the resulting molded form from the press, heating said molded form to between about 2500 and 3000° F. from about 4 to 24 hours to convert said high-calcium lime to water-free CaO and to achieve fusion of a portion of said water-free CaO with said alumina and silicate to form a matrix surrounding the remaining CaO.

10. Process for making a high-temperature refractory material, comprising the steps of mixing thoroughly together from about 65% to 85% high-calcium lime hydrate containing from about 2% to 5% by weight MgO, and from about 35% to 15% kaolin, pressing said mixture in a mold to impart structural strength sufficient to remove the resulting molded form from the press, heating said molded form to a temperature above the decomposition temperature of said high-calcium lime hydrate, cooling, crushing, grain-sizing and forming the resulted sized grains into molds and firing at temperatures ranging from about 2400 to 3000° F.

11. Process for making a high-temperature refractory material, comprising the steps of mixing together from about 65% to 85% high-calcium lime containing from about 2% to 5% by weight MgO and from about 35% to 15% of a composition consisting essentially of alumina and silica the alumina content of which ranges from about 35 to 60% by weight, pressing said mixture in a first mold to impart structural strength sufficient to remove the resulting first molded form from the press, heating said first molded form to between about 2500 and 3000° F. for from about 4 to 24 hours to achieve fusion of a portion of said components, cooling and crushing said first molded form into refractory particles, pressing said refractory particles into a second mold to impart structural strength sufficient to remove the resulting second molded form from the press, heating said second molded form to a temperature at least as high as that to which said first molded form was heated, cooling and removing the resulting refractory material from said second mold.

12. Process for making a high-temperature refractory material, comprising the steps of wet ball-milling together from about 65% to 85% high-calcium lime containing from about 2% to 5% MgO, and from about 35% to 15% of a composition consisting essentially of alumina and silica the alumina content of which ranges from about 35 to 60% by weight, partially drying the resulting wet ball-milled mixture, extruding said partially dried mixture into bricks, drying said bricks and heating them to between about 2500 and 3000° F. for from about 4 to 24 hours to convert said high-calcium lime to water-free CaO and to achieve fusion of a portion of said water-free CaO with said alumina and silica to form a matrix surrounding the remaining CaO.

13. A refractory material consisting essentially of finely-divided particles of calcium oxide embedded in a matrix of a complex formed by fusing high-calcium lime containing from about 2% to 5% MgO, $Al_2O_3$ and $SiO_2$ at temperatures ranging from about 2400 to 3000° F., said $Al_2O_3$ and $SiO_2$ in combination being present in concentrations ranging from about 15-35% by weight of said refractory material, the $Al_2O_3$ content ranging from about 35-60% by weight of said combination.

14. A refractory material in accordance with claim 13 wherein said $Al_2O_3$ and said $SiO_2$ are present in about equal parts by weight.

References Cited in the file of this patent

UNITED STATES PATENTS

| | | |
|---|---|---|
| 1,238,020 | Kennedy | Aug. 21, 1917 |
| 1,251,535 | Jones | Jan. 1, 1918 |

OTHER REFERENCES

Searle: Refractory Materials, 2nd edition, Griffin and Company, Limited, London, 1924, pp. 72–73.